United States Patent Office 3,427,533
Patented Feb. 11, 1969

3,427,533
METHOD AND APPARATUS FOR GEOPHYSICAL PROSPECTING BY MEASURING THE SPEED OF PROPAGATION OF ELECTROMAGNETIC WAVES IN THE EARTH
Robert Gabillard, Lille, France, assignor to Institut Francais du Petrole, des Carburants et Lubrifiants, Rueil-Malmaison, France
Filed Mar. 23, 1966, Ser. No. 536,745
Claims priority, application France, Mar. 24, 1965, 10,593
U.S. Cl. 324—6  5 Claims
Int. Cl. G01v 3/00, 3/12; G01r 11/00

ABSTRACT OF THE DISCLOSURE

The time of propagation of electromagnetic signals in the earth between two stations is determined by providing at each station an alternance of transmission of electromagnetic signals toward the other station and of reception of the signals emanating from the other station. This alternance has substantially the same periodicity at both stations. This periodicity is adjusted at one of the stations, so as to obtain at each station a constant time interval between the transmission of signals from this station and the reception of signals from the other station. The time of propagation of the electromagnetic signals between the stations is then derived from the measurement of this constant time interval at both stations.

---

Figure 1A:
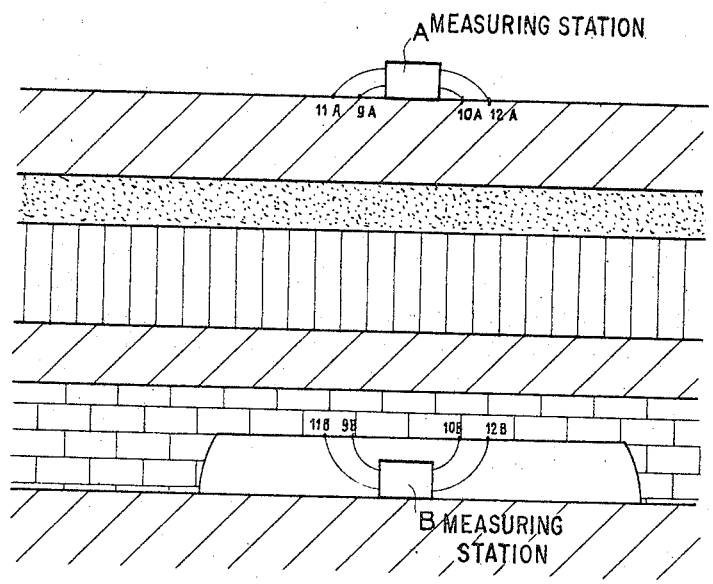

The present invention relates to methods and apparatus for geophysical prospecting in the earth by measuring the speed of propagation of electromagnetic waves in the layers of the earth being studied.

Theoretically, the speed of propagation of electromagnetic waves in the earth is readily determined if the resistivity and dielectric constant of the earth is known. But practically, the determination of these two values cannot provide a method for determining with sufficient accuracy the speed of propagation of an electromagnetic wave through a considerable distance in the earth.

The reason is, partly, the quasi-impossibility of obtaining a specimen of rock without altering its electric properties which depend exactly on the saturation in water and because of the extreme heterogeneity of the earth which results in that any local measurement is not representative of the average electromagnetic properties even of an apparently homogeneous layer of the earth.

It follows that the speed of propagation of the electromagnetic waves in the earth is a geological datum which presently is virtually unknown. To applicant's knowledge, no process for electromagnetic prospecting is based on the transmission time of an electromagnetic wave. Presently impedances are measured, which correspond to the ratio of the amplitude of the electric field to the magnetic field in a stationary system. This results in limiting the scope of geophysical prospecting by electromagnetic means.

The process of the present invention provides a direct measure of the speed of propagation of the electromagnetic waves in the earth and thus provides through its use means which improve geophysical prospecting.

The present process primarily provides a determination of the electric characteristics of subsurface layers which assists in their identification and also in the positioning of faults and discontinuities of geological structures.

The process of the present invention can be used to measure the speed of propagation of waves either between the surface of the earth and a subsurface location, such as a mine gallery for example, or between two subsurface locations, located or not in the same geological strata. These two locations should be accessible to an operator and to the devices to be installed there, which devices, as will be seen, are not voluminous and are easily transported.

The principal difficulty which applicant was forced to solve is the impossibility of transmitting information between the two measuring stations other than by the electromagnetic waves whose speed is the unknown value to be determined. Generally, it is not possible to install an electric cable between the two stations and if the installation of a cable was possible, the presence of such a cable would form a wave guide and would disturb the electrical properties of the geological medium to such an extent that the values measured would have no significance.

In the present invention there is no connection by cable between the two stations.

Figure 1B:
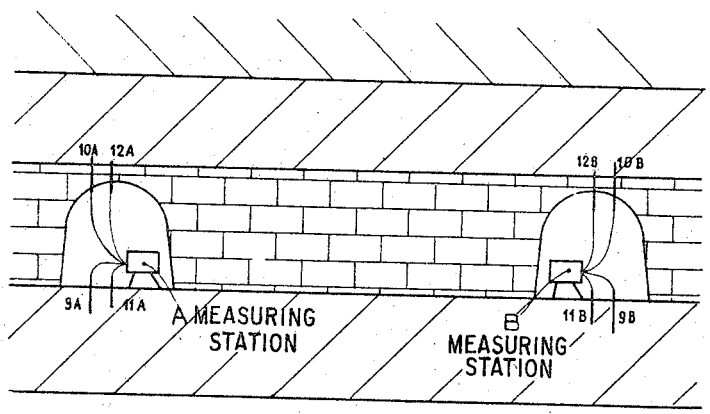

The present invention will be better understood by reference to the accompanying drawings, in which like reference characters indicate like parts, and in which FIGS. 1a and 1b show two locations for the stations for measuring the speed of the electromagnetic waves in accordance with the present invention; and FIGS. 2a to 2d show schematically embodiments of apparatus for carrying out the processes of the present concept and signal diagrams emitted by and received by this apparatus.

Figure 2A:
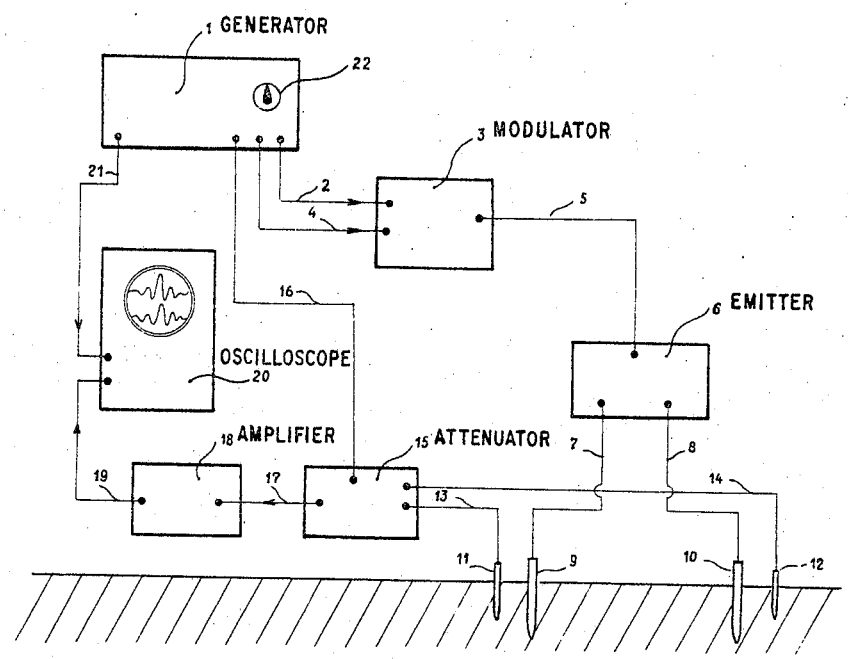

Each measuring station is provided with the same apparatus as is shown in FIG. 2a.

Figure 2B:
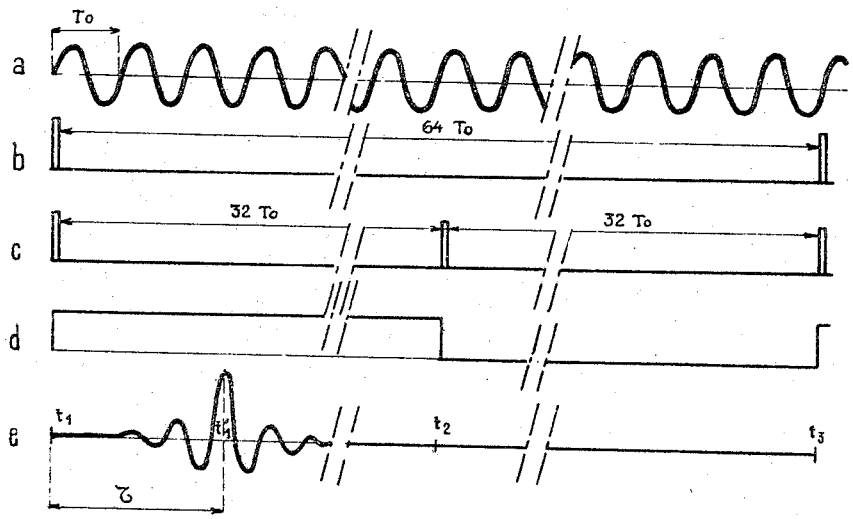

This apparatus comprises a generator or oscillator 1 controlled by a quartz crystal and providing the apparatus with four types of control signals having the wave forms shown in FIG. 2b.

An oscillation of sinusoidal shape of period $T_0$ having a wave form $a$ of FIG. 2b is taken by conductor 2 to modulator 3. Modulator 3 also receives through conductor 4 the signal shown at $b$ in FIG. 2b which is a short pulse which is repeated exactly at every $2n$ periods of the sinusoidal oscillation. The value $2n$ can be chosen advantageously as equal to a power of 2 for simplification of the electronic circuits of generator 1. In the embodiment described herein $n$ has been chosen as equal to 32. Modulator 3 transforms the sinusoidal oscillation that it receives from generator 1 into a wave train or transmission signal, for example, of the type shown at $e$ in FIG. 2b. The invention is, however, not limited to this type of wave train. Let $\tau$ represent the time which separates the instant $t_1$ at which the modulator receives through conductor 4 an impulse $b$ and the instant $t'_1$ at which the signal $e$ is then sent through conductor 5 to emitter 6, which is simply a low frequency power amplifier of known type which transmits into the earth a current I proportional to the signal $e$ through wires 7 and 8 and pegs 9 and 10. Pegs 9 and 10 can be replaced by a suitably oriented frame aerial.

Two smaller pegs 11 and 12 are planted in the earth a short distance from pegs 9 and 10, as for example, at a distance of two meters therefrom. Pegs 11 and 12 are connected by wires 13 and 14 to apparatus 15 which will now be described.

It is also possible without departing from the scope of the present invention to replace pegs 11 and 12 by an electrically shielded frame aerial which is conveniently oriented and connected to apparatus 15.

Apparatus 15 is an electronic controlled attenuator or gain commutator of known type. It receives from generator 1 through conductor 16 a control voltage having the form shown at $d$ in FIG. 2b. Between instants $t_1$ and $t_2$ apparatus 15 introduces a large attenuation between the voltage at pegs 11 and 12 on the one hand and the voltage provided by conductor 17 to high gain amplifier 18 on the other hand. Further, between the instants $t_2$ and $t_3$, apparatus 15 transmits without attenuation to amplifier 18 the voltage at pegs 11 and 12.

The output of amplifier 18 is connected by conductor 19 to the vertical deflection circuit of oscilloscope 20 of a known type.

The release of the time base of the oscilloscope is provided by generator 1 which sends to it through conductor 21 synchronization impulses as shown at c in FIG. 2b. The interval of time between two successive synchronization impulses is equal to half of the time interval which separates the control impulses of modulator 3 which for this embodiment is $32T_0$ In this way two superposed images are observed on the screen of the oscilloscope 20. One of these images is that of signal e existing between the instants $t_1$ and $t_2$ and transmitted with strong attenuation through emitter 6 beween these two instants. The other is the image of the electric voltage existing between pegs 11 and 12 between the instants $t_2$ and $t_3$. This electric voltage between these two instants is transmitted without attenuation by apparatus 15 to oscilloscope 20. This last image is observed with maximum amplification of amplifier 18 which is then not subject to saturation since emitter 6 emits no signal between the instants $t_2$ and $t_3$ as is shown in diagram e of FIG. 2b.

It is possible to displace as desired one of these images with respect to the other in the vertical direction by means of internal regulation of the apparatus which regulation adds an adjustable amplitude peak to the signal received between the instants $t_2$ and $t_3$.

Measurement of the speed of propagation of electromagnetic waves is obtained by this apparatus in the manner to be now described. A station is installed at each of two locations between which the speed of propagation of waves is to be measured comprising the apparatus shown in FIG. 2a. For example, FIG. 1a shows an installation between the surface of the earth and a mine gallery and FIG. 1b shows an installation between two subterranean locations situated in the same geological strata. The measurements obtained provide interesting information on the physical properties of the layer of earth in which the waves are propagated.

These two identical stations are designated by A and B, respectively, and the elements of their apparatus are shown by corresponding reference numerals to those of FIGS. 2a and 2b by adding the designation A or B depending upon which station is being considered.

Figure 2C:
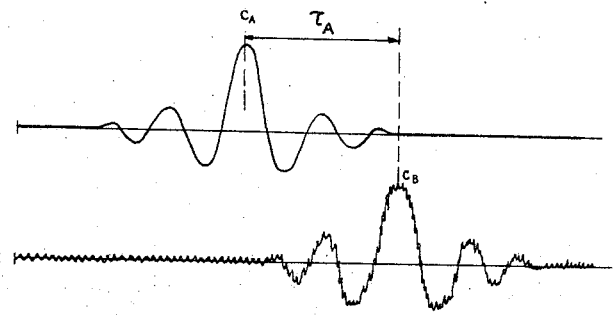

At each station, station A for example, receiving pegs $11_A$ and $12_A$ receive two types of signals. One signal is the local signal emitted by pegs $9_A$ and $10_A$ between the instants $t_{1A}$ and $t_{2A}$ and the other signal is the remote signal from the other station emitted at pegs $9_B$ and $10_B$ (FIGS. 1a and 1b). If the signal from station B arrives at station A between the instants $t_{1A}$ and $t_{2A}$ (FIG. 2b), it will not be observed at station A because, between these instants, the reception is strongly attenuated by apparatus 15 to avoid saturation of amplifier 18 by the high intensity local signal. But, if the signal from station B arrives at station A between the instants $t_{2A}$ and $t_{3A}$, it will be amplified under good conditions and it will appear on the screen of oscilloscope 20 under the local signal as is shown in FIG. 2c.

No synchronization exists between the two stations. It follows that, if the frequency of generator 1 of one of the stations is slightly different from the frequency of the generator of the other station a displacement will be observed on the screen of the oscilloscope at each of the stations such as a slow displacement of the signal from the other station toward the right or toward the left of the screen in accordance with the sign of the difference of the frequency.

This feature is used by the present invention as follows. In generators 1 an electronic circuit is provided which is controlled by control button 22 to provide very slight variation for the output frequency of the oscillator. The operator at one of the stations, station B for example, uses button 22 to obtain on the screen of his oscilloscope an immobilization of the signal coming from station A after having permitted this last signal to be received in the interval of time between $t_{2B}$ and $t_{3B}$, initially rotating control button 22 from the maximum in one sense to the maximum in the other sense. When this control is obtained, the operator at station B makes this known to the operator at station A, as for example, by interrupting his transmission for a moment. Each of the two operators then measure the displacement $t_A$ and $t_B$ respectively, between the signal that he receives from the other station and his local signal on the time scale of his oscilloscope. The sum of these differences is equal to two times the time of passage of the electromagnetic waves between the two stations, as will be shown hereinafter. Knowing the distance between the stations, the speed of propagation of the waves can be easily calculated.

When the operator at station B has obtained on his screen immobilization of the two signals one above the other, the two frequencies are necessarily equal and the period of the sinusoidal oscillation of the generators of the two stations have the same value $T_0$.

If $\delta t$ is the time of travel of the waves between the two stations, assumed to be less than $32T_0$ in the example considered, the signal from station B, when the operator at B has completed adjustment, is sent at time:

$$\delta t - \tau_B + 32T_0$$

after the instant of emission of the signal from station A, $\tau_B$ being the displacement on the screen at station B between the local signal and the signal received from station A.

This signal is then received at station A:

$$\delta t - \tau_B + 32T_0 + \delta t = 2\delta t + 32T_0 - \tau_B$$

after the emission of the local signal from station A.

But, the time base of the oscilloscope at station A being released every $32T_0$, the time which separates the passage of the spot of the oscilloscope at station A, between the peaks respectively $C_A$ and $C_B$ of the oscillograms of the local signal and of the signal received from station B is:

$$\tau_A + 32T_0$$

where $\tau_A$ is the displacement between the peaks respectively $C_A$ and $C_B$ measured on the time scale of the oscilloscope (see FIG. 2c) thus providing the relation:

$$2\delta t + 32T_0 - \tau_B = \tau_A + 32T_0$$

The terms with $T_0$ being equal, the period $T_0$ does not appear in the expression of $\delta t$ which equals:

$$\delta t = \frac{\tau_A + \tau_B}{2}$$

The measurement of the respective displacements $\tau_A$ and $\tau_B$ on the screens of the two stations A and B then furnishes the time of passage of the electromagnetic waves between the two stations, which is the speed of propagation of the electromagnetic waves in the layer of earth separating the stations. It is possible to choose the time interval $t_1 - t_2$ in such a way that it is larger than the estimated time of passage of the waves going and returning between the two stations, for example by varying the number of periods $T_0$ defining this interval.

It is also possible to use an interval of time $t_1 - t_2$ less than the time of passage of the waves going and returning between the two stations in which case the distance between the two stations should be considered when replacing the value $\tau_A + \tau_B$ by $\tau_A + \tau_B + 2n(t_1 - t_2)$, in order to determine the value of $n$ on the basis of the knowledge of the order of magnitude of the speed of propagation of the wave.

Generator 1 is constructed in such a way as to provide utilization of several values of $T_0$ corresponding to frequencies $f_0 = 1/T_0$, located in the range of low frequencies. In measuring the speed of propagation of waves for several values of $f_0$ it is possible to construct the curve of dispersion of the earth, that is, a diagram in which the frequency is the ordinant and the inverse of the wave length is the abscissa. This diagram is characteristic of the electromagnetic properties of the geological layer in which the waves are propagated.

Figure 2D:
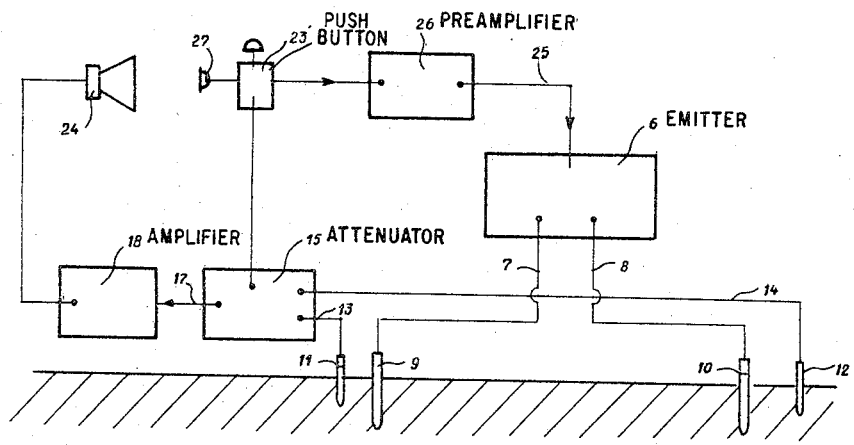

The procedure for measuring the speed of the waves can be improved as follows. It is possible for the two operators to speak to each other utilizing their apparatus. The apparatus is then adapted to include means for communication as shown in FIG. 2d.

Emitter 6 is then connected through conductor 25 to a preamplifier 26 which amplifies the output voltage of microphone 27. For reception, attenuator 15 is manually controlled by a push-button 23 which short circuits the input of preamplifier 26 and at the same time places attenuator 15 in position for minimum attenuation. The output of attenuator 15 is connected by cable 17 to amplifier 18 and the output of amplifier 18 is now connected to loudspeaker 24.

When the utilizing communication by radio phone, one of the operators gives a signal which permits both operators to simultaneously start two chronometers. Thereafter the operators place their apparatus in "measuring" condition (FIG. 2a) and the operator at station B completes the regulation of his apparatus. At a convenient time after the signal which gives operator B time for his adjustment, the two operators simultaneously take a photograph of the screen of their oscilloscope.

If one of the stations remains fixed and the position of the other station is varied it is possible to establish a range of values of the speeds of propagation of which the anomalies can be used to determine the variations in the nature of and/or the structure of the layer of earth traversed by the waves.

A more exact location of this anomaly can be determined by then maintaining fixed the formerly mobile station and varying the position of the formerly fixed station.

Changes in or modifications to the above-described illustrative embodiments of the present concept may now be suggested to those skilled in the art without departing from the invention. Reference should therefore be had to the appended claims to determine the scope of the present inventive concept.

What is claimed is:

1. A method of subsurface geophysical prospecting by determining the speed of propagation of electromagnetic waves in the layer of earth studied comprising the steps of emitting in regularly spaced intervals of time in the layer of earth from two stations spaced from each other electromagnetic waves forming transmission signals, said signals being transmitted from each station in the direction of the other station, detecting at each station the electromagnetic waves emanating from the other station and transmitted through the earth, applying to the received waves a strong attenuation during the intervals of emission at the station, adjusting the frequency of emission of the transmission signal at one of the stations until there is obtained a constant difference of time at each station between the transmission signals emitted by the station and the transmission signals received from the other station, then measuring this difference of time for each station, and then measuring the duration of the travel going and returning of the electromagnetic waves between the two stations and the speed of propagation of the waves in the layer of earth.

2. A method of geophysical prospecting as described in claim 1, the two intervals of successive emission of each station being separated by an interval of time having a duration equal to that of the intervals of emission, this duration of time being greater than twice the estimated duration of the travel going and returning of the electromagnetic waves between the two stations, the duration of this travel then being equal to the sum of the differences of time measured at the two stations respectively.

3. Geophysical apparatus for determining the speed of propagation of electromagnetic waves in the earth between two stations, comprising the combination of two similar devices placed respectively at each of the stations, said apparatus including a generator of electric control signals at each station, means for producing at each station transmission signals controlled by said control signals, means for electromagnetic emission in the earth of the said transmission signals in regularly spaced intervals of time, means for receiving at each station the signals transmitted in the earth emanating from the other station, electronic commutation means at each station controlled by said control signals and connected to said reception means, said electronic commutation means providing at each station strong attenuation of the signals received during the period of emission by the station, means for measuring the difference in time existing between the respective time of transmission of signals by the station and time of reception of signals from the other station, said measuring means being connected to said commutation means, one at least of said devices including means for adjusting the frequency of said control signals to enable reception at each station of the signals emitted by the other station in the interval corresponding to the weakest attenuation.

4. Apparatus as described in claim 3, said measuring means at each station including an oscilloscope receiving the signals emitted by said station and receiving the signals emitted by the other station, through said commutation means, said generator of the pilot signal delivering a base oscillation of adjustable frequency supplied to said means for producing transmission signals, a synchronization signal for said oscilloscope and a periodic command signal for said commutation means said synchronization signal and said command signal each having a period which is a multiple of said base oscillation.

5. Apparatus as described in claim 3, further including at each station radio communication means with the other station including a microphone, a speaker, and a commutator for connecting said microphone to said means of electromagnetic emission in the earth and connecting said speaker to said reception means.

References Cited

UNITED STATES PATENTS 2,276,974   3/1942   Howard _____ 324—1

RUDOLPH V. ROLINEC, *Primary Examiner.*

G. R. STRECKER, *Assistant Examiner.*

U.S. Cl. X.R.

324—70